United States Patent
Mikkelsen et al.

(10) Patent No.: US 7,078,669 B2
(45) Date of Patent: Jul. 18, 2006

(54) READOUT CIRCUIT AND METHOD FOR SPARSE READOUT OF ACTIVE AND NEIGHBORING PIXELS IN A MULTI-PIXEL SENSOR ARRAY

(75) Inventors: Sindre Mikkelsen, Oslo (NO); Terje Orskaug, Oslo (NO)

(73) Assignee: Gamma Medica - Ideas (Norway) AS, Bærum (NO)

( * ) Notice: Subject to any disclaimer, the term of this patent is extended or adjusted under 35 U.S.C. 154(b) by 123 days.

(21) Appl. No.: 10/506,495

(22) PCT Filed: Feb. 18, 2003

(86) PCT No.: PCT/IL03/00126

§ 371 (c)(1),
(2), (4) Date: Sep. 3, 2004

(87) PCT Pub. No.: WO03/075555

PCT Pub. Date: Sep. 12, 2003

(65) Prior Publication Data

US 2005/0116139 A1    Jun. 2, 2005

(30) Foreign Application Priority Data

Mar. 7, 2002   (IL) .................................... 148555

(51) Int. Cl.
*H01L 27/00* (2006.01)
*G01J 1/42* (2006.01)

(52) U.S. Cl. .................. 250/208.1; 250/208.2; 348/302; 348/307

(58) Field of Classification Search ............ 250/208.1, 250/208.2, 370.1, 370.09, 370.14; 348/302, 348/307–310

See application file for complete search history.

(56) References Cited

U.S. PATENT DOCUMENTS

| 5,107,122 | A | 4/1992 | Barkan et al. |
| 5,825,033 | A | 10/1998 | Barrett et al. |
| 5,847,396 | A | 12/1998 | Lingren et al. |
| 6,590,215 | B1 * | 7/2003 | Nygard et al. ......... 250/370.09 |

FOREIGN PATENT DOCUMENTS

EP    0893705 A2    1/1999

* cited by examiner

*Primary Examiner*—Stephone B. Allen
*Assistant Examiner*—Patrick J. Lee
(74) *Attorney, Agent, or Firm*—Browdy and Neimark, PLLC

(57) ABSTRACT

A readout circuit (29) for reading active pixels in a sensor (10) having at least one sensor segment (11) each containing addressable pixels (12) includes a respective sample and hold unit (28) for sampling and holding an analog value associated with a corresponding pixel, and an analog multiplexer (35) in each segment having an addressable channel coupled to each sample and hold unit for carrying the corresponding held value of the respective pixel. A lookup table (38) stores addresses of predefined neighboring pixels associated with the respective pixel. An encoder (36) is responsive to one or more trigger signals for generating an address in the lookup table, and a controller (37) feeds the address to the lookup table and successively feeds the addresses of the predefined neighboring pixels output by the lookup table to the analog multiplexer.

12 Claims, 3 Drawing Sheets

READOUT CIRCUIT AND METHOD FOR SPARSE READOUT OF ACTIVE AND NEIGHBORING PIXELS IN A MULTI-PIXEL SENSOR ARRAY

FIELD OF THE INVENTION

This invention relates to a charge detector for reading charge produced by an active pixel in the detector.

BACKGROUND OF THE INVENTION

A known diagnostic technique used in tomography for locating tumors involves injecting into a patient's bloodstream a radioactive isotope which targets the tumor, so that the location of the tumor can be derived by detecting the location of the radioactive isotope. Typically, the radioactive isotope emits γ-rays which are dispersed from the tumor site. In order to achieve the desired detection so as to determine the precise location of the tumor, it is necessary to image the patient's body in such a manner as to detect only those γ-rays which are emitted normally from the body and to ignore those γ-rays which are dispersed in other directions.

Different types of computer tomography are known in which such a radiation imaging system may be embodied. In Single Photon Emission Computed Tomography (SPECT) more than one detector is rotated around the subject and the radioisotope's distribution (tomographic image) is reconstructed based on an obtained count values of the γ-rays.

In contrast to SPECT where a radioisotope in the body emits γ-rays produced by a single photon, in Positron Emission Tomography (PET) a patient is administered a radioisotope that emits positrons (i.e. positively charged electrons). When the positrons meet electrons within the body, the positrons and electrons mutually annihilate and produce two γ-rays that propagate away from each other at an angle of 180° and are detected by respective detector segments in the PET scanner. The scanner's readout electronics record the detected γ-rays and map an image of the area where the radioisotope is located. Here also two simultaneous detections are indicative of a positron emission from the tumor site.

Ideally, if during every scan of the composite image sensor, each pixel is read sequentially only one at a time, then the current scan in each segment can be terminated when an "active" pixel is detected assuming that only pixel in each segment can be active. However, two factors militate against this ideal approach. First, it is impractical to read each pixel in such a manner because of the time overhead involved in addressing each pixel separately and downloading the pixel data along a dedicated channel for further processing. Secondly, this ideal approach assumes that each pixel corresponds to a strike by single photon. However, in practice, the energy of an impinging γ-ray may not be totally absorbed by a single pixel but may be shared by more than one pixel. This will occur, for example, when the γ-ray strikes a pixel off-center so that its energy is shared by a central pixel (usually absorbing most of the energy) and one or more neighboring pixels, which together absorb the residual energy. It can also occur owing to Compton scattering, which may occur in any high-energy particle detector as explained above but forms the principle of operation in a Compton camera.

For the purpose of the present discussion, a Compton camera may be regarded as just another type of 2-dimensional image sensor having a plurality of addressable pixels, one of which emits a signal when stimulated by a γ-ray. Specifically, each pixel is a diode which generates a charge signal when hit by a γ-ray. A γ-ray emitted by the radioisotope will be detected only if it creates a Compton effect by creating a charge signal thereby giving up some of its energy. In practice, it is usual to employ a composite sensor having several spaced-apart sensor layers each containing at least one sensor module so as to increase the probability that an incident γ-ray will produce a Compton effect in at least one of the layers. The multi-layer sensor module constitutes a first detector of the Compton camera. Having thus produced a Compton effect, the γ-ray then emerges from the first detector. However, in order to calculate the angle of the incident γ-ray, the emergent γ-ray is directed to a second detector in which it is absorbed completely, thereby giving up all of its residual energy. Such a detector is described in EP 893 705 published on Jan. 27, 1999 entitled "Multi-Channel Readout circuit for Particle Detector" and assigned to the present applicant.

Photons produced by Compton scattering are formed substantially simultaneously. The scattering process by which this typically occurs is that the photon interacts with an electron (primary hit), but not all of its energy is deposited. The photon changes direction, and may deposit the remainder of the energy in a different pixel with a secondary interaction with an electron. Thus, if two active pixels are detected simultaneously and their combined energy is conducive with their being derived by Compton scattering from an incident γ-ray having an energy of 511 keV, then the position of each energy emission allows a collision line between the locations of the first and second collisions to be determined, and their respective energies allow determination of the angle of Compton scattering.

It is thus desirable to read two or more active pixels in a pixel array without the need to read all the pixel data so as to reduce the time required to perform computer tomography and hence the time for which a patient is exposed to radiation.

One known approach to doing this is to use so-called sparse readout, such as described in U.S. Pat. No. 5,847,396 (Lingren et al.) assigned to Digirad Corporation, which discloses a high-energy photon imaging system comprising an imaging head that includes a detector having a plurality of detection modules. Each detection module comprises a plurality of detection elements fixed to a circuit carrier. The circuit carrier includes channels for conditioning and processing the signals generated by corresponding detection elements. Each channel stores the amplitudes of the detection element electrical pulses exceeding a predetermined threshold. The detection modules employ a fall-through circuit, which avoids the need for sequential readout and automatically finds only those detection elements whose stored pulse amplitude exceeds the threshold. The fall-through circuit searches for the next detection element and associated channel having a valid event, meaning that the detection element exhibits a pulse magnitude that exceeds a certain threshold. Use of sparse readout in a PET camera is also described in U.S. patent application Ser. No. 09/827,439 filed Apr. 5, 2001 in the name of the present assignee and entitled "Improved Readout circuit for a Charge Detector".

Another approach that may be used independently of sparse readout, or in addition thereto, is described in U.S. Pat. No. 5,825,033 (Barrett et al.) published Oct. 20, 1998 and entitled "Signal processing method for gamma-ray semiconductor sensor", which relates to the need to read sub-threshold data of neighboring pixels. In order to do so, all pixels must be read out in order to define a "central pixel"

and a "neighborhood" of related neighboring pixels whose data must be also be read since there exists an a priori likelihood that charge is shared between the central pixel and one or more of the neighboring pixels. Specifically, it is to be noted that the voltage signal for each pixel must be compared to a corresponding predetermined threshold in order to identify all pixels having an above-threshold voltage signal. Thereafter, clusters of adjacent pixels are identified having above-threshold voltage signals and a cumulative voltage signal associated with the cluster is calculated. Thus, U.S. Pat. No. 5,825,033 is not related to a sparse readout system that attempts to reduce the number of pixels whose voltage signals must be read, but rather reads all pixels in the pixel array.

U.S. Pat. No. 5,107,122 (Barkan et al.) published Apr. 21, 1992 and entitled "Sparse readout method and apparatus for a pixel array" does relate to sparse readout of a pixel array where outputs are obtained only from selected pixels. These pixels are determined by those pixels that have received actuating inputs, and may consist of the hit pixels and their immediate neighbors. The system obtains outputs from the selected pixels only for the times that correspond to the occurrence of an event of interest. By such means, the amount of data to be processed is substantially reduced. A content addressable memory is used to store the times when photons strike pixels, whose locations in the pixel array are stored in a random access memory. Active pixels are read sparsely column-by-column and on reaching an active pixel, the pixel in each row in the active column for which a hit occurred since the time of the previous event of interest is accessed and compared with the row addresses of the pixels hit at the time of the current event of interest. By such means associated pixels may be read being those that are hit at the same time as the current event of interest. However, these pixels must be in the same pixel array and thus the readout method is suitable for charge sharing but may not be suitable for Compton scattering where charge can be scattered between spatially separated pixel arrays.

It is thus to be noted that neighboring pixels are determined on the fly according to the time stamp associated with each event. This allows associated pixels to be determined on the basis of simultaneity of photon impingement. Although sparse readout is used to identify active columns and thus avoids the need to read each pixel sequentially, there is no attempt to define a priori for each pixel a subset of neighboring pixels, being those most likely to be associated with an active pixel.

Another problem in all readout circuits relates to dead time in the system. When reading out one pixel in a sampled system, all pixels that are sampled but not read are also "dead". As such, if during the act of sampling these pixels, a different photon strikes one of the sampled pixels, this event will be lost. It is impossible to eliminate dead time altogether but by sampling only a subset of the pixels, the other pixels should in principle be in an active "reading-mode" and so the effects of dead time are reduced. This is true also in U.S. Pat. No. 5,107,122 but only for the single detector segment to which this patent relates. Thus, it is clear from FIG. 2 of U.S. Pat. No. 5,107,122 that only a single detector segment is contemplated. Moreover, it is to be noted that the readout chip in U.S. Pat. No. 5,107,122 is configured as an array having a plurality of readout circuits each corresponding to a respective pixel in the sensor chip and being aligned therewith and connected thereto by means of bump contacts. Such an arrangement is particularly convenient for a single detector segment, since neighboring pixels in the sensor chip are directly mapped to neighboring circuits in the readout chip.

However, in practice, it is not always feasible to employ such a structure. For example, in our EP 893 705 there are disclosed multiple detector segments each comprising an array of 16×16 pixels, i.e. 256 pixels per pixel array and each being coupled to a corresponding channel of a one-dimensional ASIC having 256 channels. Each ASIC channel provides pre-amplification, noise-filtering and generation of trigger signals. A trigger is generated whenever the input charge exceeds a certain threshold. If the primary hit alone is detected by the ASIC, the remainder of the charge deposited in other pixels can be recovered by reading out the neighboring pixels. In a one-dimensional detector array, neighboring detector elements are usually connected to neighboring ASIC channels. Reconstruction of physical events in case of charge sharing or Compton scattering can be done by reading out neighboring ASIC channels. However, in a system where pixels are connected to an ASIC having a one-dimensional channel array structure, the two dimensions of the pixel array are mapped into one dimension.

It thus emerges that the simple structure of U.S. Pat. No. 5,107,122 allowing direct mapping of neighboring pixels to neighboring circuit elements in the readout chip is impractical. When mapping a two-dimensional sensor to a one-dimensional ASIC, neighboring pixels, such as those along an edge of the sensor chip that border an active pixel in a different row or column, may map to a channel in the ASIC that is remote from the channel associated with the active pixel. This renders impossible an intuitive understanding as to which channels in the ASIC neighbor the channel associated with the active pixel.

This problem is, of course, exacerbated when multiple detector segments are used. In computer tomography applications, multiple detector segments may be required in order to increase the effective area that can be imaged. Moreover, in Positron Emission Tomography (PET) a patient is administered a radioisotope that emits positrons (i.e. positively charged electrons). When the positrons meet electrons within the patient's body, the positrons and electrons mutually annihilate and produce two γ-rays that propagate away from each other at an angle of 180° and are detected by respective detector segments in the PET scanner. Thus, two detectors are required on opposite sides of the patient. Each of these detectors may, and typically will, comprise multiple sensor segments.

Moreover, when multiple sensor segments are used, potential neighboring pixels may in fact reside in adjacent sensor segments, thus requiring that one or more adjacent sensor segments be sampled. Such sensor segments are typically "dead" for the read out period such that new trigger events are lost. This applies regardless of whether the sensor segments are part of the same detector or belong to different detectors.

SUMMARY OF THE INVENTION

It is therefore an object of the invention to provide a readout circuit for reading an "active" pixel in an image sensor having a plurality of pixels and for each active pixel reading neighboring pixels that are defined for the active pixel a priori and thus may be read out without reading other pixels in the pixel array.

According to a broad aspect of the invention there is provided a method for sparsely reading data representative of pixel energy of an active pixel and of neighboring pixels in at least one sensor segment having a plurality of addressable pixels, the method comprising:
(a) for each pixel in the at least one sensor segment storing in a lookup table addresses of predefined neighboring pixels,
(b) on determining that a pixel in the at least one sensor segment is active, using an address of said pixel to read from the lookup table corresponding addresses of the neighboring pixels associated therewith, and
(c) reading data representative of pixel energy of the active pixel and of successive ones of its neighboring pixels.

A readout circuit in accordance with the invention for reading active pixels in a sensor having at least one sensor segment each containing a plurality of addressable pixels, comprises:

a sampling circuit coupled to each pixel in each of the segments, for sampling an energy level associated with at least one active pixel, a lookup table having a plurality of addressable locations each corresponding to a respective pixel in the sensor and storing addresses of predefined neighboring pixels associated with the respective pixel, an encoder having a plurality of input lines each for connecting to a respective trigger channel corresponding to each pixel in the sensor and responsive to one or more trigger signals for generating an address in said lookup table, and a controller coupled to an output of the encoder for feeding the address generated by encoder to the lookup table and for feeding the addresses of the predefined neighboring pixels output by the lookup table to a respective channel of the sampling circuit for reading the energy level of the respective neighboring pixel.

Thus, according to the invention, a "center" or "primary" pixel is first defined and this allows automatic determination of the neighboring pixels. Only after deriving this information, is the pixel energy level read-out. This results in a much sparser readout than hitherto proposed approaches. More specifically, this is so because in the invention the threshold detection is done before the multiplexing. In addition, the read-out can be terminated before the entire neighborhood has been read out, if the controller determines that all of the charge has been collected. The architecture supports one or several signals above threshold. In principle, all channels can actually receive a trigger and still be read out. In a preferred architecture, typically both the energy and the address of the primary hit are read out simultaneously.

Traditionally, a low threshold is needed in order to identify all detector elements that receive part of the charge, as the triggers are used to flag which pixels should be read out. The primary pixel is usually easy to detect, as most of the energy is deposited in this detector element. Providing technical solutions for a threshold that is low enough for all detector elements that contain a minor part of the charge to be detected is difficult, as the noise limit of the system imposes a lower limit. Thus, if the threshold is set too low, then spurious noise signals will be registered as active pixels and this imposes a minimum threshold, which may be too high to trap secondary pixels that received a minor portion of the charge. The invention provides a solution for identifying all energy information, based on a detection of the primary hit alone. This allows the threshold to be kept high, which simplifies the design significantly.

The invention is applicable to a pixel sensor having one or more dimensions and thus contemplates also one-dimensional pixel array structures. However, the readout circuit according to the invention specifically addresses the mapping from a two-dimensional pixel array to one or more one-dimensional ASICs (column of read-out channels).

BRIEF DESCRIPTION OF THE DRAWINGS

In order to understand the invention and to see how it may be carried out in practice, a preferred embodiment will now be described, by way of nonlimiting example only, with reference to the accompanying drawings, in which.

DETAILED DESCRIPTION OF SPECIFIC EMBODIMENTS

Figure 1:
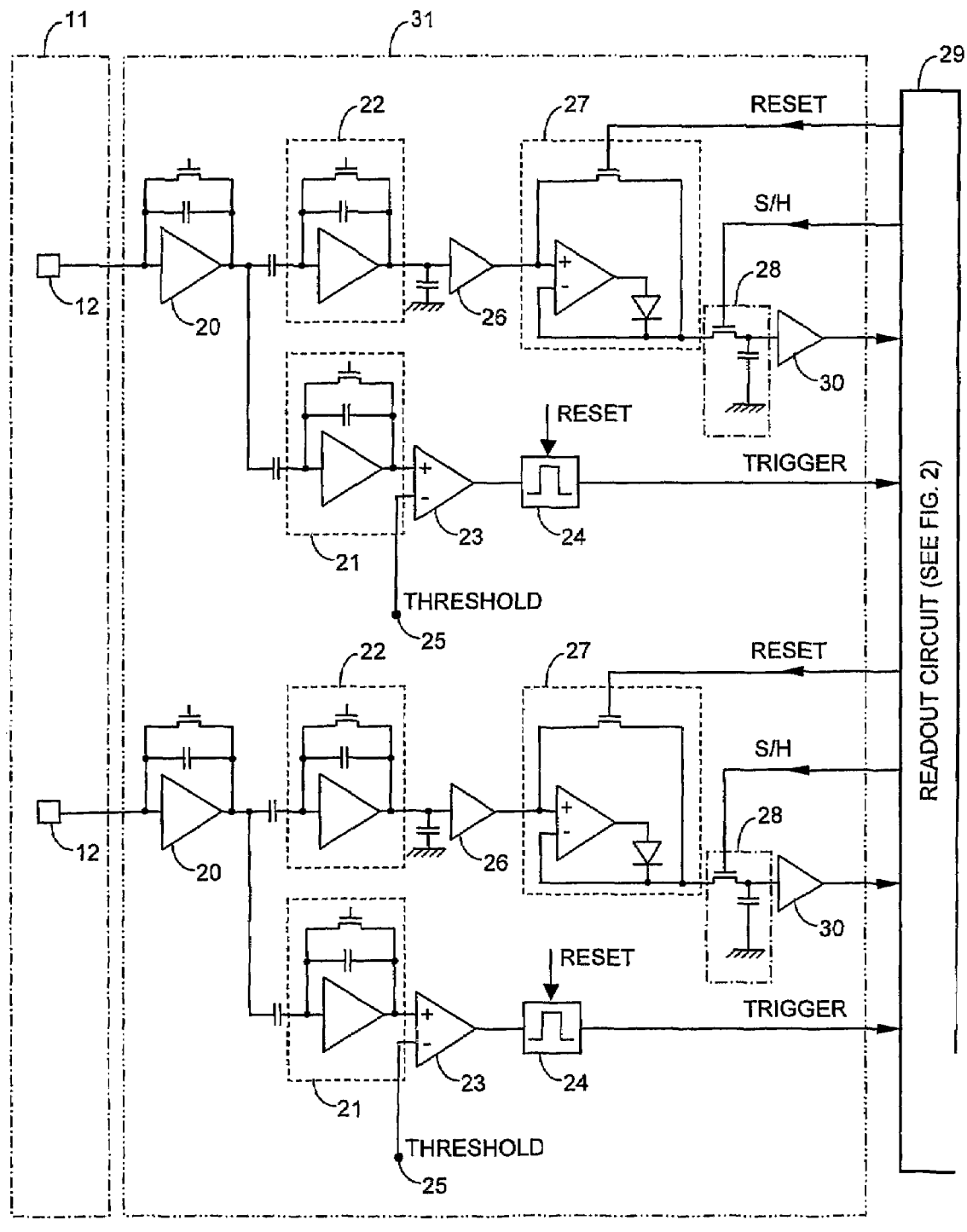
FIG. 1 is a schematic diagram showing a partial detail of a particle detector.

FIG. 1 shows schematically a partial detail of a particle detector depicted generally as 10 comprising one or more sensor segments 11 each having a plurality of detector elements or pixels 12, only two pixels and their respective channels being shown in the figure. All pixels 12 are connected to respective preamplifiers 20 whose outputs are fed to a respective fast shaper 21 for establishing an incident time of radiation striking the pixel and to a respective slow shaper 22 for determining the peak energy value of the pixel if it goes active. The respective output of each fast shaper is fed to a threshold discriminator 23 whose output is fed to a monostable 24 whose output goes high when the output of the fast shaper exceeds a predetermined threshold level 25, and remains high until the monostable 24 is reset The outputs of the slow shapers 22 are fed via a respective buffer 26 to a respective track-and-hold circuit 27 whose output tracks closely the output of the slow shaper 22, but only as long as the amplitude increases (for positive input signals). When the amplitude of the output of the slow shaper 22 sinks after it has reached its peak, the output of the track-and-hold circuit 27 stays constant at the maximum amplitude until being reset. By such means, the respective pixel energy of all pixels is latched regardless of whether the pixel energy is below or above threshold. This feature makes it possible to delay sampling until after the center pixel has been read out, which gives the benefit of reduced dead-time. As shown in FIG. 1 the reset signal is fed directly to the analog part of the channel constituted by the track-and-hold circuit 27, as well as to the trigger part of the channel constituted by the monostable 24.

The maximum signal level held by the track-and-hold circuit 27 is read by a respective sample and hold circuit 28 if activated by an external sample and hold signal produced by a readout circuit 29. The monostables 24 constitute trigger outputs that are input to the readout circuit 29. The outputs of the sample and hold circuits 28 are fed via a buffer 30 to the readout circuit 29. Typically, the preamplifiers 20, the fast and slow shapers 21 and 22, the threshold discriminators 23, the monostables 24, the buffer 26 and the track-and-hold circuits 27 are constituted by a corresponding channel of an ASIC 31 having a plurality of channels, and which may also integrate some of the components described below with reference to FIG. 2 of the drawings. The ASIC 31 thus has a plurality of channels, albeit possibly fewer than the total number of pixels 12 in the sensor segments 11, which would then require multiple ASICs each connected to a respective group of pixels in each sensor segments 11.

Figure 2:
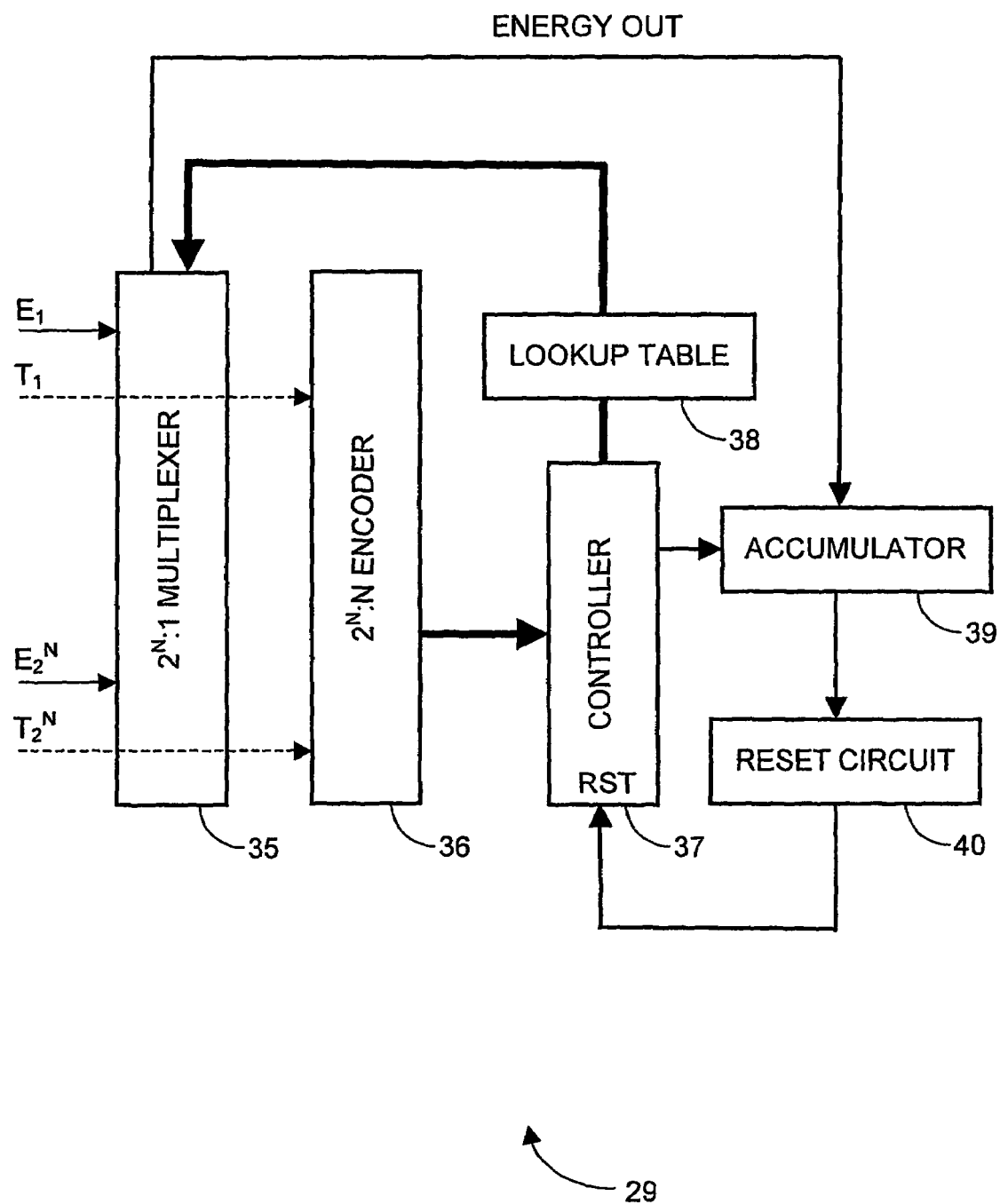
FIG. 2 is a schematic diagram showing part of a readout circuit according to the invention for reading the energy values associated with simultaneously active pixels in the particle detector of FIG. 1.

FIG. 2 is a schematic diagram showing the readout circuit 29 for reading the energy values associated with simultaneously active pixels in the particle detector 10. The amplified and noise-filtered energy-signal output from the ASIC channels are denoted $E_1$–$E_{2^N}$. These channel outputs are connected to the inputs of a $2^N$:1 multiplexer 35. The trigger outputs generated by the respective monostables 25 in each of the ASIC channels ($T_1$–$T_{2^N}$) are connected to the inputs of a $2^N$:N encoder 36. The N-bit output of the encoder 36 is connected to the inputs of a controller 37. When a signal exceeds the threshold, the corresponding ASIC channel generates a trigger. This trigger generates a N-bit address on the output bus of the encoder 36. This can be done either asynchronously or hand-shaken. The controller 37 is operatively coupled to a look-up table 38 containing the addresses of the channels that correspond to the neighboring pixels of the primary hit pixel. Thus, it performs the mapping from the two-dimensional detector pixel array on to one or more of the one-dimensional ASIC channel arrays. An output bus of the controller 37 is connected to a N:$2^N$ decoder. The outputs of the decoder are connected to the N control inputs of the multiplexer 35. The input selected by the control inputs is connected to the output of the multiplexer 35, thus allowing the corresponding analog energy value of the addressed pixel to read out. The energy of the neighboring channels is read out by addressing them sequentially on the output bus of the controller 37, thus reconstructing a physical event of simultaneous impacts of multiple pixels by a single photon by detecting only the primary hit pixel.

Preferably, the controller 37 further includes an accumulator 39 for calculating cumulative energy read from the active pixels and successive neighboring pixels as the respective pixel energy of each successive neighboring pixel is read. A reset circuit 40 is coupled to the accumulator 39 and is responsive to the cumulative energy exceeding a predetermined value for resetting the encoder, typically under control of the controller 37 to which a reset signal is fed. When used in a particle detector for detecting γ-rays, the energy of each γ-ray is 511 keV, which may be shared by a primary pixel and associated neighboring pixels, as explained above. The reset circuit 40 allows the reading of successive neighboring pixels to be terminated in the event that the cumulative energy of those pixels read so far equals or is close to 511 keV, thus obviating the need to read remaining neighboring pixels which in any case will be inactive.

It should be noted that the ASIC 31 may also include all or part of the additional circuitry described above with respect to FIG. 2 and, in an actual design reduced to practice, the ASIC 31 included the multiplexer 35 and the encoder 36.

In use, a preferred implementation employs two read-out modes. The first mode will be used to read out center pixels. This read-out mode could for instance be as described in our above-mentioned U.S. patent application Ser. No. 09/827,439 or in U.S. Pat. No. 5,847,396 also mentioned above. Thus, in the first pass, only channels with triggers are read out. Based on this, the controller 37 can (possibly with some help from the information stored in the look-up table 38) define which neighbors to read, if any. The controller 37 then sets the ASIC 31 to the second mode, which reads out the neighboring pixels addressed by the look-up table 38. Evident from this, the architecture supports in principle any number of simultaneously triggered channels, and any combination of pixels containing all or part of the charge.

Figure 3:
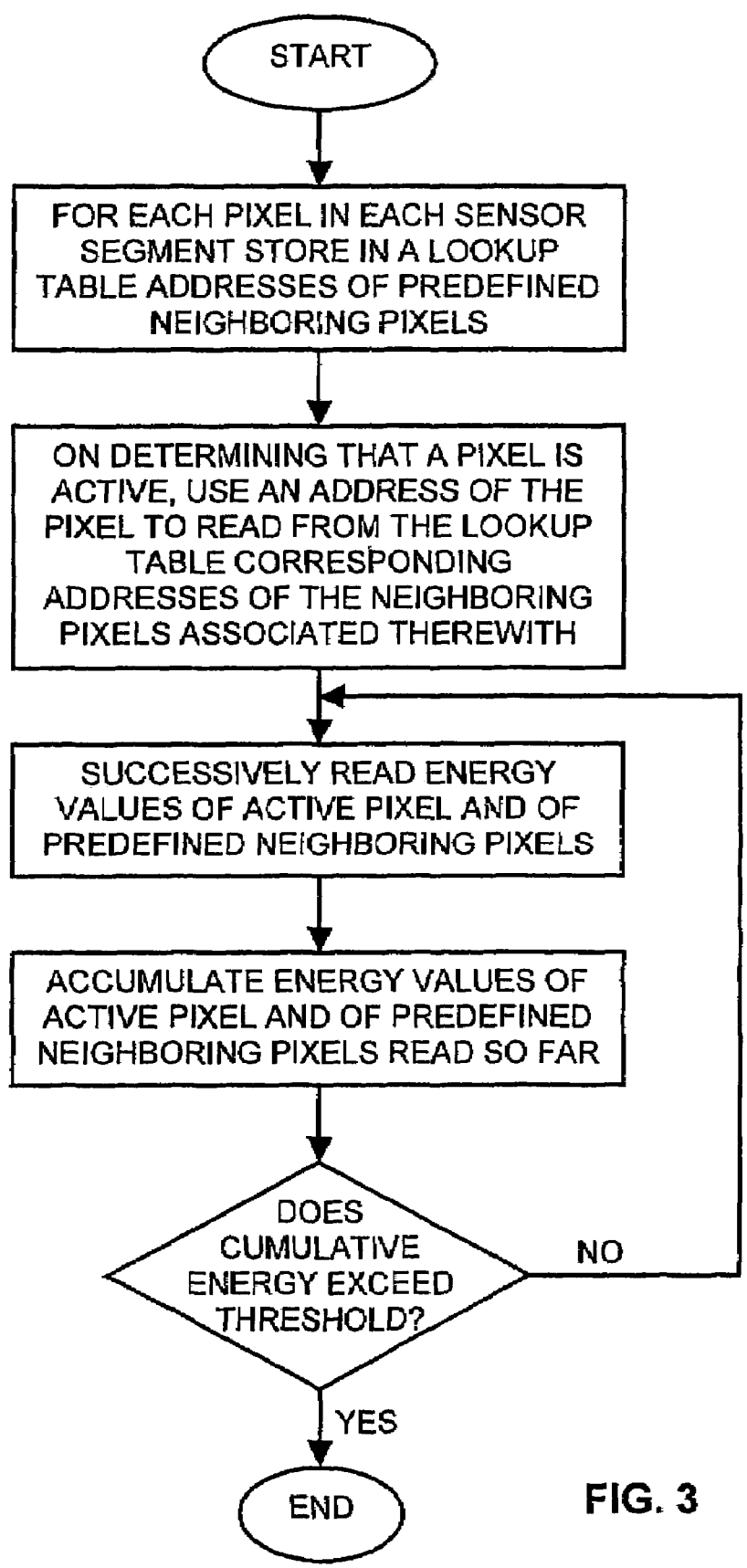
FIG. 3 is a flow diagram showing a method for reading a primary pixel and associated neighboring pixels using the readout circuit of FIG. 2.

FIG. 3 is a flow diagram showing how charge distributed between a primary (or "active") pixel and one or more neighboring pixels may be read using the readout circuit 29, without needing to obtain trigger outputs from the neighboring pixels. Thus, for each pixel in each sensor segment there is stored in the lookup table 38 addresses of predefined neighboring pixels. On determining that a pixel in the at least one sensor segment is active, the address of the active pixel is used to read from the lookup table 38 corresponding addresses of the neighboring pixels associated therewith. Thus, addresses of the neighboring pixels are successively read from the lookup table 38 and fed to the multiplexer 35. By such means, data representative of the pixel energy of the active pixel and of its neighboring pixels are successively read from the analog multiplexer.

Sample and hold (S/H) and reset can be performed in the following manner. Triggered channels sample themselves, and are reset after read-out. Pixels which are read out using the address mechanism can be sampled upon addressing and reset after read-out. It should be noted that the sampling (addressing of the neighboring pixels) and the eventual read-out can be done in any order. For instance, all pixels could be sampled first and then read out or each pixel could be sampled and read out before the next pixel.

As the energy of each pixel is read, the cumulative energy associated with the primary pixel is calculated, and the energy of each successive neighboring pixel is read for so long as the cumulative energy is less than the total energy associated with the photon. For example, in a particle detector using γ-rays whose energy is 511 keV, a threshold may be set close to this value so that when all, or substantially all, of an incident photon's energy is accounted for, any remaining neighboring pixels need not be read, since they will in any case have no shared photon energy.

The manner in which neighboring pixels are assigned to each pixel in the sensor may vary according to each specific application. In a simple two-dimensional pixel array, a 3×3 or 5×5 sub-matrix centered on the primary pixel is usually sufficient to retrieve the exact position and energy of a photon bombardment. Thus, the addresses of all nine pixels in a 3×3 matrix centered on each pixel, or of all 25 pixels in a 5×5 sub-matrix centered on each pixel are stored in the lookup table 38. To optimize the read-out speed, in a 3×3 sub-matrix with the triggered pixel being in the middle, four of the immediate neighbors will have a higher chance for sharing parts of the charge. This is easily understood since the four corner pixels in the sub-matrix share only a corner with the primary pixel, as distinct from the four remaining neighboring pixels which abut the active pixel along a complete edge thereof. Thus, the likelihood is lower for charge sharing to occur with the four corner pixels. The sequence of the neighboring pixels in the first row (and to some extent also the second row) can thus be optimized.

However, the principles of the invention are not limited to simple planar structures. Thus, the invention is equally applicable in a Compton camera similar to that described in EP 893 705, where a sensor contains several spatially separated sensor segments. In such a sensor, a photon striking one sensor segment can be Compton scattered in a second segment. Theoretically, Compton scattering can even occur in more than two sensor segments, although statistically the likelihood of this occurring is reduced as a photon that is partially absorbed in one segment strikes other segments displaced therefrom. It thus emerges that the greatest likelihood of Compton scattering is in the same segment, and the likelihood of Compton scattering becomes progressively smaller in successive displaced segments.

Thus, in accordance with empirical data, it may be assumed that Compton scattering is limited to within two pixels from the primary pixel, in all directions. This allows neighboring pixels to be defined a priori for each pixel for which there is a reasonable likelihood of Compton scattering. Some of these neighboring pixels will be in the same sensor segment and some will be in an immediately adjacent segment of a multi-segment sensor.

In a specific application reduced to practice, neighboring pixels were defined on the assumption that Compton scattering can cross pixel array borders while charge sharing cannot. By identifying a primary hit on the border between sensor segments, pixels in both sensor segments may be read out in order to reconstruct the event. From the point of view of the readout circuit, any pixel can be defined as a neighboring pixel and read out. But in practice it is desirable to minimize the necessary number of pixels to read out and therefore the manner in which neighboring pixels are defined will inevitably be a compromise between the need to account for charge sharing as accurately as possible and the desire to do so as quickly as possible.

It will be apparent to those skilled in the art that, while a preferred embodiment has been described, modifications can be effected thereto without departing from the scope of the invention as defined in the claims. For example, FIG. 2 shows a particularly simple implementation of the invention only, wherein channel triggers will immediately and asynchronously cause an address to be conveyed to the controller. This address acts like an interrupt that starts a read-out sequence in which all interesting pixels (including the center pixel) are read out by sending the primary pixel address to the look-up table.

It should also be noted that only those parts of the system relating to reading of the neighboring pixels are shown in the figures. In practice, the trigger circuitry shown in FIG. 1 may be interfaced to the readout circuit 29, of which only part is shown in FIG. 2. Such interface may, for example, allow for sparse readout as described in U.S. patent application Ser. No. 09/827,439 but this is not essential to an understanding of the invention. It should also be understood that the analog multiplexer reduces hardware complexity, but is not absolutely essential. Thus, in FIG. 2 where the energy of the active pixels is fed to the controller and accumulator by only a single connection multiplexing is clearly necessary. However, the invention could be realized by converting the analog signal produced by each pixel to an equivalent digital signal and then processing the digital signals. Also, theoretically, albeit not currently practically, the outputs of all channels could be processed directly. Likewise, the pixels could be arranged in groups each adapted for processing by a respective multiplexer and allowing direct processing of all channels in each group, thus allowing some direct and some parallel processing.

It should also be noted that while in the preferred embodiment a sample and hold unit is used to latch the energy of each active pixel, other approaches are known in the art. Thus, sample and hold units are used in EP 893 705 where the trigger event is determined independently of the energy level of the active pixel and the energy is therefore read out only after establishing which pixels are active. This requires that the pixel energy be shaped by fast and slow shapers. However, it is known in the art to read a pixel digitally by converting the analog pixel energy to a digital signal and then processing the digital signals. This would obviate the need to provide a hardware sample and hold mechanism since the sampling and processing could then be implemented using software. This is particularly applicable where coincidence of two or more active pixels is not processed in real time.

It should also be noted that the track-and-hold component 27 is strictly only essential for latching pixel energy when pixels with sub-threshold energy are to be sampled at a random time after the event occurs. It is also possible, but generally less convenient, to sample each pixel's energy with a sample and hold unit only, providing that it is known when to sample the peak of the slow shaper.

As noted above, when addressed read-out is performed, the information from the look-up table may be used as direct control of which pixel energy is coupled to the energy output. This means that there may actually be two entirely different read-out controls, depending on whether the read-out is for the primary pixel or for the neighbors. According to yet another approach, all information from the look-up table can be buffered in the channels. This is particularly beneficial for allowing multiple trigger events, since each triggered pixel and its respective neighboring pixels can then be processed. If buffering is not provided, then, as noted above, during the act of reading the neighboring pixels of a triggered event, subsequent triggered events are lost owing to "dead time". Buffering may be done, for example, in combination with the sparse read-out of U.S. patent application Ser. No. 09/827,439, which works by latching trigger information in a flag in each channel, and reading out only flagged channels. This can also be done in this case for the addressed read-out such that for each address that the look-up table supplies to the ASIC, the corresponding channel flag can be set. In this manner, all addressed channels will be read out using the same type of control as the primary hits.

The invention claimed is:

1. A method for sparsely reading data representative of pixel energy of an active pixel and of neighboring pixels in at least one sensor segment having a plurality of addressable pixels, the method comprising:
   (a) for each pixel in the at least one sensor segment storing in a lookup table addresses of predefined neighboring pixels,
   (b) on determining that a pixel in the at least one sensor segment is active, using an address of said pixel to read from the lookup table corresponding addresses of the neighboring pixels associated therewith;
   (c) reading data representative of pixel energy of the active pixel and of successive ones of its neighboring pixels;
   (d) calculating cumulative energy read from the active pixels and successive neighboring pixels as the respective pixel energy of each successive neighboring pixel is read; and
   (e) repeating (c) and (d) in respect of successive neighboring pixels only for as long as the cumulative energy is less than a predetermined value.

2. The method according to claim 1, wherein the addresses of the predefined neighboring pixels associated with an active pixel correspond to pixels in more than one sensor segment.

3. A readout circuit for reading active pixels in a sensor having at least one sensor segment each containing a plurality of addressable pixels, the readout circuit comprising:
   a sampling circuit coupled to each pixel in each of the segments, for sampling an energy level associated with at least one active pixel, a lookup table having a plurality of addressable locations each corresponding to a respective pixel in the sensor and storing addresses of predefined neighboring pixels associated with the respective pixel, an encoder having a plurality of input lines each for connecting to a respective trigger channel corresponding to each pixel in the sensor and responsive to one or more trigger signals for generating an address in said lookup table, a controller coupled to an output of the encoder for feeding the address generated by encoder to the lookup table and for feeding the addresses of the predefined neighboring pixels output by the lookup table to a respective channel of the sampling circuit for reading the energy level of the respective neighboring pixel, a threshold discriminator responsive to a pixel energy level for producing an output signal when the pixel energy level exceeds a threshold value, a resettable monostable responsive to the output signal of the threshold discriminator for generating said trigger signal, an accumulator for calculating cumulative energy read from the active pixels and successive neighboring pixels as the respective pixel energy of each successive neighboring pixel is read, and a reset circuit coupled to the accumulator and being responsive to the cumulative energy exceeding a predetermined value for resetting the encoder and the monostables.

4. The readout circuit according to claim 3, wherein:

the sampling circuit includes a sample and hold unit in respect of each pixel in the sensor for carrying a corresponding sampled and held value of the respective pixel, and there is provided in each segment an analog multiplexer having a plurality of addressable channels each coupled to a respective one of the sample and hold units for carrying the corresponding sampled and held value of the respective pixel.

5. The readout circuit according to claim 3, wherein:

the sampling circuit includes a track and hold unit in respect of each pixel in the sensor for carrying a corresponding peak energy value of the respective pixel, and there is provided in each segment an analog multiplexer having a plurality of addressable channels each coupled to a respective one of the track and hold units for carrying the corresponding peak energy value of the respective pixel.

6. The readout circuit according to claim 4, wherein the controller is adapted to feed the addresses of the predefined neighboring pixels output by the lookup table successively to the analog multiplexer.

7. The readout circuit according to claim 3, wherein:

the sensor includes at least first and second spatially separated sensor segments, and the lookup table stores addresses of pixels in the second sensor segment in respect of one or more pixels in the first sensor segment.

8. The readout circuit according to claim 5, wherein the controller is adapted to feed the addresses of the predefined neighboring pixels output by the lookup table successively to the analog multiplexer.

9. The readout circuit according to claim 4, wherein:

the sensor includes at least first and second spatially separated sensor segments, and the lookup table stores addresses of pixels in the second sensor segment in respect of one or more pixels in the first sensor segment.

10. A charge readout detector having at least one sensor segment each containing a plurality of addressable pixels, the charge readout detector including a readout circuit for reading active pixels, the readout circuit comprising:

a sampling circuit coupled to each pixel in each of the segments, for sampling an energy level associated with at least one active pixel, a lookup table having a plurality of addressable locations each corresponding to a respective pixel in the sensor and storing addresses of predefined neighboring pixels associated with the respective pixel, an encoder having a plurality of input lines each for connecting to a respective trigger channel corresponding to each pixel in the sensor and responsive to one or more trigger signals for generating an address in said lookup table, a controller coupled to an output of the encoder for feeding the address generated by encoder to the lookup table and for feeding the addresses of the predefined neighboring pixels output by the lookup table to a respective channel of the sampling circuit for reading the energy level of the respective neighboring pixel, a threshold discriminator responsive to a pixel energy level for producing an output signal when the pixel energy level exceeds a threshold value, a resettable monostable responsive to the output signal of the threshold discriminator for generating said trigger signal, an accumulator for calculating cumulative energy read from the active pixels and successive neighboring pixels as the respective pixel energy of each successive neighboring pixel is read, and a reset circuit coupled to the accumulator and being responsive to the cumulative energy exceeding a predetermined value for resetting the encoder and the monostables.

11. The charge readout detector according to claim 10, wherein:

the sampling circuit includes a sample and hold unit in respect of each pixel in the sensor for carrying a corresponding sampled and held value of the respective pixel, and there is provided in each segment an analog multiplexer having a plurality of addressable channels each coupled to a respective one of the sample and hold units for carrying the corresponding sampled and held value of the respective pixel.

12. The charge readout detector according to claim 10, wherein:

the sampling circuit includes a track and hold unit in respect of each pixel in the sensor for carrying a corresponding peak energy value of the respective pixel, and there is provided in each segment an analog multiplexer having a plurality of addressable channels each coupled to a respective one of the track and hold units for carrying the corresponding peak energy value of the respective pixel.

* * * * *